Oct. 14, 1969  J. B. BRIGGS  3,473,130
PULSE PAIR MEASUREMENT
Filed June 14, 1966  2 Sheets-Sheet 1
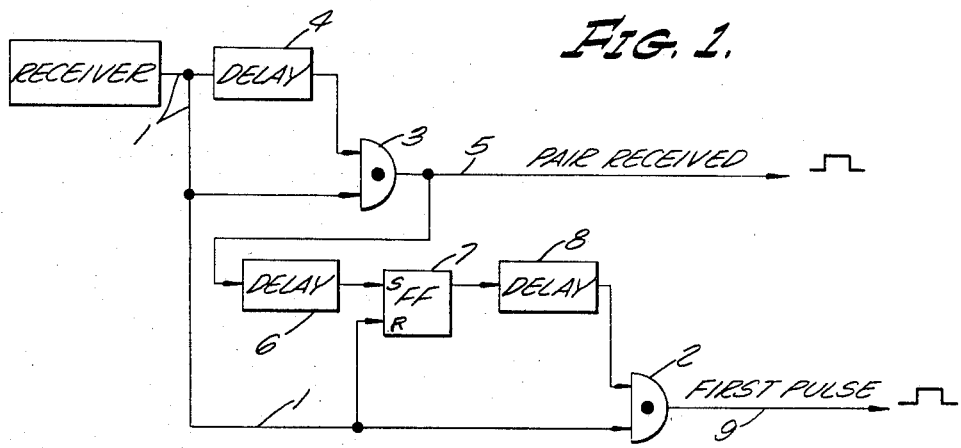
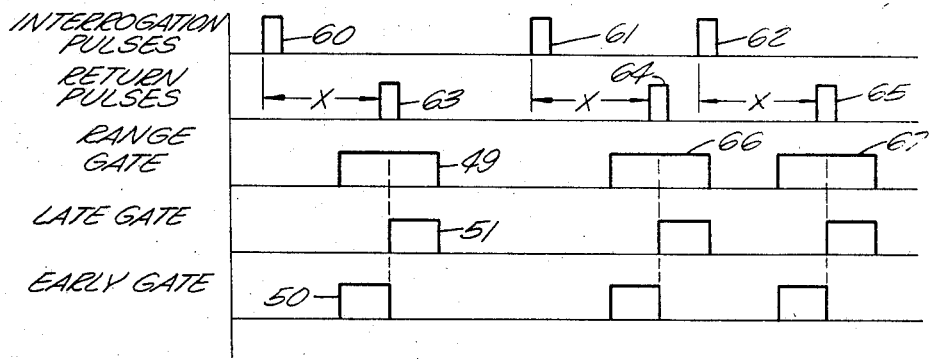
INVENTOR.
JAMES B. BRIGGS
BY
Lyon & Lyon
ATTORNEYS

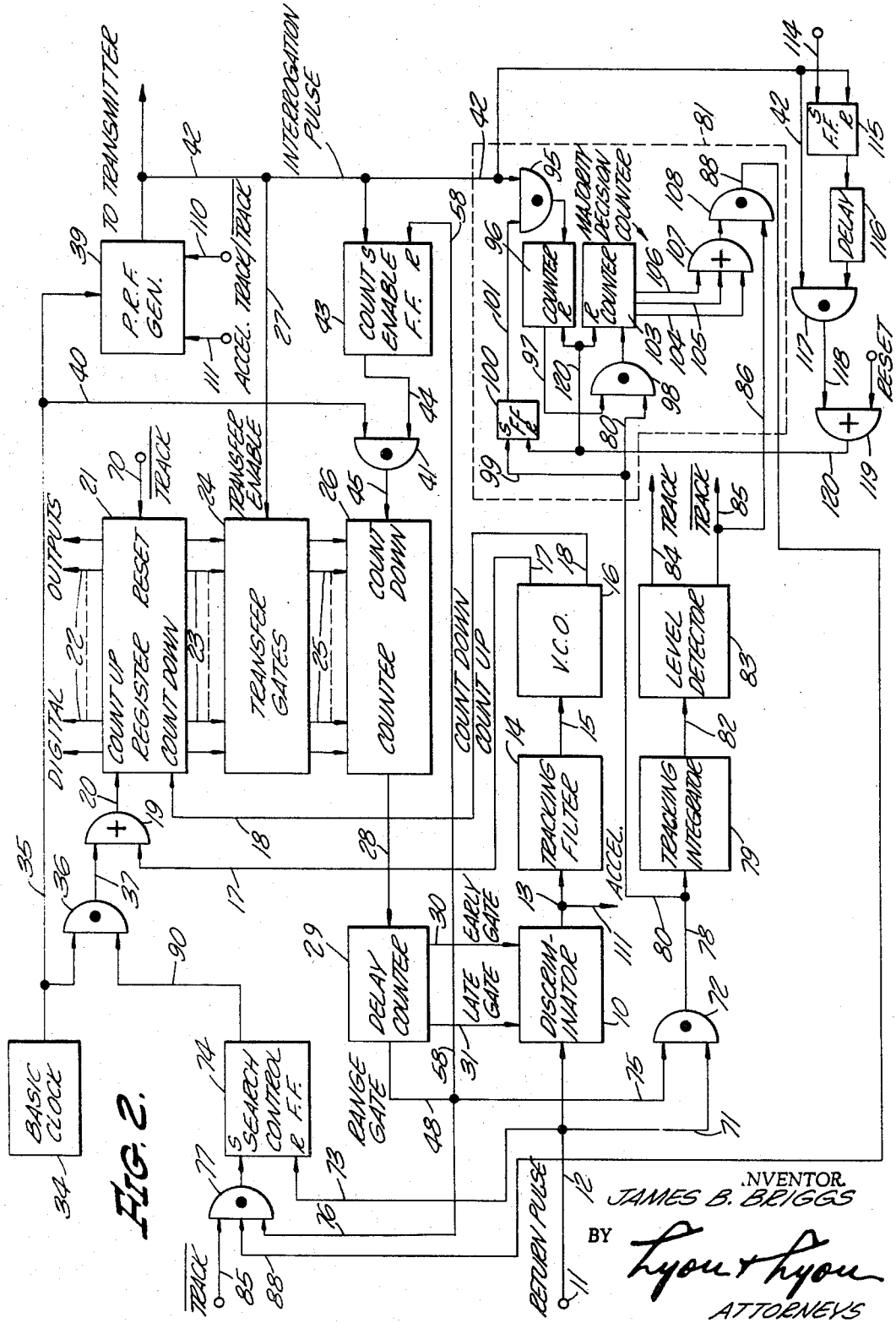

3,473,130
PULSE PAIR MEASUREMENT
James B. Briggs, La Crescenta, Calif., assignor to Hoffman Electronics Corporation, El Monte, Calif., a corporation of California
Filed June 14, 1966, Ser. No. 557,574
Int. Cl. H03k 5/20
U.S. Cl. 328—109                    12 Claims

ABSTRACT OF THE DISCLOSURE

There is disclosed herein a system for determining if received pulses have occurred as a pair of known spacing, and which also passes only the first pulse of each pair of pulses. The circuit is disclosed for use in a navigation system or the like for controlling a range computer thereof as it is searching for return pulses from a beacon to eliminate time consuming operations which may occur when false pulses are received. In operation, the first pulse of a pair is delayed a time identical to the proper spacing of pulse pairs, and the delayed pulse and second pulse of a pair are applied to a gate which provides an output indicating when a proper pair is received. This output is delayed and used to control a bistable device, to which also is applied the pulse pairs. The output of this device is delayed and applied to a gate which likewise has the pulse pairs applied thereto, and which passes only the first pulse of a pair.

---

The present invention relates to measurement of pairs of pulses and more particularly to a circuit for determining the receipt of a pair of pulses having a given spacing therebetween.

In certain electronic systems it is desirable or necessary to determine if pulses are occurring randomly or in precisely spaced pairs. In radio air navigation systems, for example, the range measuring portion of a TACAN (tactical air navigation) system, pulse pairs are utilized. That is, the pulses transmitted, received and operated upon occur in discrete pairs of pulses rather than single pulses. These systems measure both the range and azimuth of a beacon with respect to an airplane and provide visual indications thereof to the pilot of the airplane. A multichannel receiver-transmitter is provided on the airplane and operates with pulses to provide both range and bearing information. A number of ground beacons are available and each includes a transmitter and directional antenna for bearing information, and a receiver-transmitter and non-directional antenna for range information.

For range measurements by a TACAN system, the transmitter in the airplane repeatedly transmits very narrow and widely spaced interrogation pulses. These pulses, which actually are pulse pairs, are received by the ground beacon receiver, the transmitter of which transmits "reply" pulse pairs. These reply or return pulse pairs are received by the receiver in the airplane, and timing circuits measure the round trip travel time, or interval between the interrogation and reply pulses, and convert this interval into signals which operate a range indicator within the airplane.

It will be appreciated in making accurate measurements of this nature, the proper pulse of the pairs must be used. In conventional TACAN systems, a time delay measurement is made between the second pulse transmitted by the airborne transmitter and the second pulse received by the airborne receiver from the beacon. Typically, the first return pulse is received and delayed for a time corresponding to the time duration between the pulses of a pair. The delayed pulse is used to open a gate which then allows the second pulse of the pair, if a pair exists, to pass. This second pulse is then used for range computations.

Reference may be made to copending U.S. patent application Ser. No. 577,529, now Patent No. 3,354,455, entitled "Digital Delay Measurement System" filed concurrently herewith by James B. Briggs and Marvin P. Vander Plaats for a general discussion of radio air navigation systems. This copending application, the disclosure of which is incorporated herein by reference, discloses a novel delay measurement system which may be used in a navigation system for measuring range. In the system disclosed in said copending application, the first pulse of a pulse pair is employed for performing range measurements because the novel system enables accurate range measurements to be made without the requirement of determining that a received pulse is one of a pair. The disclosure of said copending application also describes the manner in which the system "searches" for proper return pulses. This portion of the system also operates with the first pulse of pulse pairs, but a time savings may be realized if the existance of a pair is determined in this mode inasmuch as the system may expend time searching false return pulses.

Accordingly, it is an object of the present invention to provide an improved circuit for measuring the occurrence of a pair of pulses.

It is an additional object of the present invention to provide an improved circuit for determining the occurrence of a pair of pulses, and for passing only the first pulse of the pair.

It is an additional object of this invention to provide an improved pulse pair detector for use in air navigation systems.

These and other objects and advantages of the present invention will become more apparent upon reference to the accompanying description and drawings in which:

FIGURE 1 is a circuit according to this invention;
FIGURE 2 illustrates a system with which the circuit of FIGURE 1 may be used; and
FIGURE 3 is a diagram of pulses encountered in the operation of the system of FIGURE 2.

In accordance with a preferred embodiment of the present invention, a circuit is provided for determining if received pulses have occurred as a pair of known spacing. Additionally, the circuit passes only the first pulse of the pair. Briefly, the first pulse of a pair is delayed for a time duration substantially identical to the proper spacing of the pulses of a pair, and the delayed pulse and second pulse of a pair are applied to a gate. The gate provides an output indicating that a proper pulse pair has been received, and this output is delayed and applied to control a bistable device. The pulses, both pulses of the pair, are applied also to control the bistable device but in an opposite manner. The output of the bistable device is delayed and used to enable or disable a gate, which has both pulses applied thereto, to pass only the first pulse of a pair. In a navigation system, the circuit of the present invention may be employed in a time delay measuring system, such as a navigation range computer, for passing only the first pulse of a pair thereto, and for controlling the range computer as it is searching for return pulses from a beacon to eliminate time consuming operations which may occur when false pulses are received.

FIGURE 1 illustrates a circuit according to the present invention for receiving pulses from a source, such as a receiver, and for selecting the first pulse of a pair of pulses and indicating that a pair of pulses has been received. The output of the receiver may supply return pulse pairs from a beacon through a line 1 to an input of an "and" gate 2, and input of an "and" gate 3 and to a delay circuit 4. The delay circuit 4 may include a counter which provides a delay the same as the delay between the pulses of a pair, for example 12 microseconds in a navigation system. The output of the delay circuit 4 is applied through a line to another input of the "and" gate 3. The gate 3 provides an output on a line 5 indicating that a pulse pair has been received when the first pulse delayed by the circuit 4 occurs with the second pulse of the pair. As will appear subsequently, the output on the line 5 may be used to affect the operation of the range measuring system while searching for proper return pulses.

The output of the gate 3 is connected through a delay circuit 6 to the set input of a flip-flop 7, and the line 1 is connected to the reset input thereof. The output of the flip-flop 7 is connected through a delay circuit 8 to another input of the "and" gate 2. The total delay of the circuits 6 and 8 preferably is greater than the pulse width of a pulse. Hence, each may provide approximately a two microsecond delay for an input pulse width of three microseconds. The output of the gate 2 is connected to an output line 9 to supply only the first pulse of each pair.

Assuming that the flip-flop 7 is set (the upper output thereof is true), the gate 2 is enabled and the first pulse of a pair passes through the gate 2 to the output line 9. This pulse also resets the flip-flop 7, and after the delay time of the circuit 8 the gate 2 is disabled. The first pulse also is delayed by the delay circuit 4. When the second pulse of the pair arrives, it does not pass through the desirable gate 2. However, the gate 3 is enabled at this time (by the delayed first pulse and the second pulse) and sets the flip-flop 7 after the delay of the circuit 6. After the delay of the circuit 8, the gate 2 is enabled to pass the first pulse of the next pair. The delay provided by the circuits 6 and 8 ensures that the gate 2 is not enabled or disabled too soon and ensures that at least the leading edge of the first pulse of a pair is passed.

Not only may the output of the gate 2 be used to pass the first pulse of a pair in a time delay measurement system, such as a navigation system, but also the output of the gate 3 may be used to indicate that a pair, rather than a single false pulse, is received in the search mode to prevent the system from continuing to search for false pulses. That is, if a false pulse is received, the system can be controlled to disregard this pulse rather than searching for similar pulses occurring at a similar rate as will be described in greater detail subsequently.

FIGURE 2 illustrates a system for measuring time delay between signals of the nature of that disclosed in said copending application, the disclosure of which is incorporated herein by reference. Although not intending to be limited thereby, this system will be described in the environment of a radio air navigation system, such as a TACAN system for measuring the distance or range between an airplane and a beacon. It will be appreciated that although the circuit and system described herein are particularly useful for range measurements in an air navigation system, various applications are possible where accurate pulse pair measurements and measurements of time delay between signals are required.

The system illustrated in FIGURE 2 includes both means for performing a time delay measurement as well as means for searching for proper return pulses. A portion of the system used for time delay measurements includes a discriminator 10 which essentially compares the time of arrival of a signal with a predicted time of arrival. This signal or pulse, which typically is approximately three microseconds in duration, is derived from the output of the gate 2 of the circuit shown in FIGURE 1. Thus, the output line 9 of the gate 2 may be connected to an input terminal 11 of the system in FIGURE 2, the terminal 11 being connected through a line 12 to the input of the discriminator 10. The output of the discriminator, which is an error signal proportional to the error between the actual time of arrival and the predicted time of arrival, is applied through a line 13, a tracking filter 14 and a line 15 to a voltage controlled oscillator 16. The tracking filter 14 preferably is a low pass filter which provides an average output signal over a number of error signals from the discriminator and aids in the discrimination against noise, spurious signals, etc. In a navigation system, for example, the tracking filter 14 may be a simple resistance-capacitance filter having a one-second time constant to average over 30 to 50 signals from the discriminator 10 to discriminate against noise, etc., as mentioned above, and to enable the pilot to receive meaningful visual indications of range rather than rapidly changing indications which would be substantially impossible to read.

The voltage controlled oscillator 16 responds to the output of the filter 14, which output is an average error signal and may be zero or vary up or down, to provide output "count up" or "count down" signals on respective output lines 17 an 18. If, for example, a pulse is received on the line 12 earlier than predicted, the oscillator 16 provides count down signals on the line 18; whereas count up signals are generated and applied to the line 17 if the received pulse is late.

The count up line 17 is coupled through an "or" gate 19, which will be explained in greater detail subsequently, and a line 20 to a count up input of a counting register 21; whereas the count down line 18 is connected to a count down input of the register 21. The register 21 is a digital register which serves to count input pulses applied thereto and store the resulting count, and to provide an indication of time delay on output lines 22. In a navigation system, a binary number, such as 40, in the register 21 may serve to indicate a range between the airplane and ground beacon of, for example, one mile. Thus, the output on lines 22 of the register 21 may be used directly to operate a digital indicator, or converted to analog information for operating analog instruments, to provide visual indications of the range to the pilot of the airplane. Additionally, the output of the register 21 may be used directly, or after being converted to an analog form, for supplying information to other aircraft sub-systems, such as a flight computer, autopilot, etc.

The outputs of the register 21 also are coupled through line 23, transfer gates 24 and lines 25 to a counter 26. By providing a "transfer enable" signal on a line 27 coupled to the transfer gate 24, the contents of the register 21 are shifted in parallel into the counter 26. As will be explained in more detail subsequently, the counter 26 counts clock pulses downwardly from the number shifted into the counter, and provides an output on a line 28 upon a predetermined count (such as zero) to initiate gating pulses, which may be done directly initiated by the counter 26 or through the operation of a delay counter 29.

The delay counter 29, which is a conventional counter, provides a gating pulse output after a predetermined delay. This gating pulse may be termed a "range gate" and includes "early" and "late" gate pulses applied through respective lines 30 and 31 to the input of the discriminator 10. The early and late gate pulses each may be, for example, ten microseconds in duration, with the late gate pulses commencing at the termination of the early gate pulse. These pulses are used to "bracket" the return pulse applied to the input terminal 11 and through the line 12 to the input of the discriminator. That is, if the return pulse of the line 12 falls within the overall range gate pulse, an output is provided from the discriminator 10 on the line 13 proportional to the deviation of the return pulse on the line 12 with respect to the center of the range gate pulse, the center of the range gate pulse typically occurring at the termination of the early gate pulse and the commencement of the late gate pulse. Thus, the output of the discriminator 13 is an error signal indicating the deviation in time of the return pulse with respect to the estimated time of arrival of the return pulse. The error signal is zero if the return pulse is precisely bracketed by the range gate pulse, or falls entirely outside the range gate pulse.

A master or basic clock 34 is used in the time delay measurements, and may be a precision crystal oscillator. In the case of a radio air navigation system, the frequency of the clock 34 may be 3.23 megacycles, for example. Clock pulses are applied on a line 35 through an "and" gate 36 and a line 37 to an input of the "or" gate 19 for reasons which will be described subsequently. Clock pulses also are applied on the line 35 to a pulse repetition frequency generator 39 and through a line 40 to an input of an "and" gate 41.

The generator 39 is synchronized by the clock 34 and provides "interrogation pulses" on an output line 42. The line 42 is connected to the line 27 to provide transfer enable pulses to enable the transfer gates 24 to transfer data from the register 21 to the counter 26. The line 42 also is connected to a "set" input of a count enable flip-flop 43, and output of which is connected through a line 44 to a second input of the "and" gate 41. The output of the "and" gate 41 is connected through a line 45 to a count down input of the counter 26.

A pulse supplied on the line 42 by the generator 39 enables the transfer gates 24, and sets the flip-flop 43 which in turn enables clock pulses to pass through the gate 41 to the count down input of the counter 26. Each pulse on the line 42 from the generator 39 also is applied to a transmitter when the system is used in a radio air navigation system. In a TACAN system, for example, a pulse from the generator 39 causes the transmitter to transmit a pulse pair to a ground beacon as well as initiates the operation of the time delay measuring system as discussed above. Subsequently, the ground beacon receives the transmitted pulse pair and, after a predetermined delay in the ground beacon station, transmits a return pulse pair which is received by the airborne receiver. The received pulse pair is applied to the circuit of FIGURE 1, and the first pulse of a pair is applied through the line 12 to the input of the discriminator 10 as the return pulse.

In the operation of the system shown in FIGURE 2, the register 21 initially holds a binary number which results from the register counting clock pulses applied through the "and" gate 36 and the "or" gate 19 as will be explained in greater detail subsequently. This number in the register 21 represents an estimate of the average time delay between first and second pulses, these pulses respectively being the interrogation pulse on the line 42 and a return pulse on the line 12. The generator 39 generates an interrogation pulse which is applied through the line 42 and the line 27 to enable the transfer gates 24, and to set the count enable flip-flop 43. When the transfer gates 24 are enabled, the number stored in the register 21 is transferred in parallel into the counter 26 through the gates 24. When the flip-flop 43 is set, the output thereof on the line 44 goes true thereby enabling the "and" gate 41 to pass clock pulses from the line 40 through the line 45 to the count down input of the counter 26. The counter 26 then subtracts clock pulses, i.e., counts down, until a predetermined number, typically zero, is reached. An output is provided from the counter 26 on the line 28 to the delay counter 29 when this predetermined number is reached.

The delay counter 29 is a short counter to further subtract any desired system delays. For example, in a TACAN system, the delay counter 29 may essentially subtract a delay of fifty microseconds which represents the system time delay of a ground beacon. It will be appreciated that the delay counter 29 need not be used in certain applications or if used, may form a part of the counter 26 by extending the length of this latter counter.

The delay counter 29 provides a pair of output pulses which are termed early and late gate pulses respectively on lines 30 and 31. A composite of these two pulses is called a range gate pulse 49 and is applied on an output line 48. FIGURE 3 illustrates each of these pulses. In a TACAN system, for example, the delay counter 29 may generate a ten microsecond wide early gate pulse 50 forty microseconds after the delay counter has been enabled by a signal on the input line 28, and generate a ten microsecond wide late gate pulse 51 fifty microseconds after being enabled by the signal on the line 28. Thus, the range gate pulse may have a typical duration of twenty microseconds, with the midpoint of this pulse occurring fifty microseconds after the counter 26 reaches the aforementioned predetermined count and provides an output on the line 28.

As discussed above, the interrogation pulse from the generator 39 causes a pulse to be transmitted to a ground beacon in a navigation system, and this pulse is received by the ground beacon and a return pulse is transmitted after a standard delay. If the number in the register 21 is precisely representative of the distance between the airplane and the ground beacon, the return pulse occurs at the midpoint of the range gate pulse (i.e., centered at the end of the early gate pulse and at the beginning of the late gate pulse) causing the discriminator 10 to provide a zero error signal. If the return pulse does not fall at the midpoint of the range gate pulse, an error signal is provided at the output of the discriminator 10 which is filtered in the tracking filter 14 and applied to control the voltage controlled oscillator 16. If the return pulse is early, the oscillator 16 provides pulses on the count up line 17 causing the register 21 to count up. If the return pulse is late, the oscillator 16 provides pulses on the count down line 18 causing the register 21 to count down. Typically, the oscillator output goes up as high as 50 pulses per second in a navigation system. Depending on the type of oscillator 16 used, its outputs may be either both zero or both equal for a zero input to the oscillator. In either case for a zero error signal the contents of the register 21 remain static.

The above process of sampling return pulses and providing appropriate error and count up or count down pulses is repeated with the number in the register 21 being transferred to the counter 26, the counter 26 counting down etc., upon the generation of each interrogation pulse thereby causing the system to "track," even though the times of arrival of the return pulses may vary. The contents of the register 21, which may be read out on output lines 22, thus is representative of the time delay between an interrogation pulse and a return pulse. In a navigation system, this time delay is proportional to range and the output of the register 21 may be used to operate a visual indicator within the airplane. Likewise, the output of the register 21 may supply such information to other airplane sub-systems, such as a flight computer, autopilot, etc.

The tracking filter 14 averages the error signal output from the amplifier 55, and the voltage controlled oscillator 16 responds to this average error signal and generates output pulses to change the range register 21 to a correct value. Additionally, the range gate pulse is applied through a line 58 to a reset input of the count enable flip-flop 43 to reset this flip-flop which in turn disables the "and" gate 41 thereby preventing further clock pulses from being applied to the input of the counter 26.

In certain applications it is desirable or necessary to search for proper return pulses. This is particularly true in TACAN systems wherein the airborne transmitter transmits interrogation pulses and the airborne receiver receives reply pulses from the ground beacon along with various other pulses, such as reply pulses from the ground beacon to other airplanes. In standard TACAN systems, each airplane's interrogation pulses occur at a rate which is intentionially varied in an irregular or random manner, although over a period of time pulses occur at a given frequency. For example, during the "tracking mode" in which the range is measured, up to approximately 30 pulses per second are generated; whereas in the "search mode" in which the system searches for proper return pulses, up to approximately 150 pulses per second are generated. Inasumch as the pulses from each airplane occur in a random manner, the equipment within a given airplane detects proper reply pulses to the airplane, by searching for return pulses occurring in the same random pattern as those transmitted from the airplane. Accordingly, the system shown in FIGURE 2 also includes circuits for achieving the search function. Essentially, the system searches for three or more return pulses occurring at the proper rate for a given number of transmitted interrogation pulses, and subsequently the system goes into the track mode. If fewer than three out of five proper return pulses are received, the system continues to search for the proper return pulses.

The search system starts to look for a return pulse at a predetermined range, such as zero, and then continuously moves out or extends this range to find a return pulse. When a return pulse is found, the search stops and the system looks at return pulses for a time, i.e., for five pulses, to see if return pulses are occurring at the proper rate. If so, the correct pulses are being received and the system goes into the track mode. If proper pulses are not found three out of five times, the search continues by causing the range register to count out further.

As shown in FIGURE 3 interrogation pulses 60 through 62, and thus the pulses transmitted by the airborne transmitter, occur in a random fashion. Proper return pulses 63 through 65 occur in a like random fashion a substantially fixed delay time "x" after the interrogation pulses. If three of the return pulses 63 through 65 fall properly within respective range gate pulses 49, 66 and 67, the proper return pulses are being received and the system subsequently goes into a track mode for providing a continuous measurement of time delay, and thus range, as described previously.

A line 70 is connected to a reset input of the range register 21 in FIGURE 2 to reset this register when the system is not in the track mode, and thus is in the search mode. Although the line 70 may receive a voltage level, only the leading edge thereof is used to reset the register 21. After being reset, the register 21 operates in a normal manner to count and store input pulses. The search for proper return pulses may start at a range of zero if the register 21 is set to zero, or at a different range if desired. The return pulses are applied from the terminal 11 through a line 71 to an input of an "and" gate 72, and through a line 73 to a reset input of a search control flip-flop 74. The output line 48 from the delay counter 29, which supplies range gate pulses, is connected through a line 75 to another input of the "and" gate 72. The range gate output line 31 from the counter 29 is connected through a line 76 to an input of an "and" gate 77. The output of the "and" gate 73 is connected through a line 78 to the input of a tracking integrator 79 and through a line 80 to an input of a majority decision counter 81.

The output of the tracking integrator 79 is connected through a line 82 to a level detector 83 which provides "track" and "not track" ($\overline{track}$) outputs on respective lines 84 and 85. The "not track" output line 85 is connected through a line 86 to another input of the majority decison counter 81. The interrogation pulse line 42 from the generator 39 is connected to an input of the counter 81. The output of the counter 81 is connected through a line 88 to an input of the "and" gate 77, which also receives a "not track" input from the line 85. The output of the counter 81 is true as long as fewer than three out of five proper return pulses have been received. An output of the flip-flop 74 is connected through a line 90 to another input of the "and" gate 36.

The generator 39 initiates interrogation pulses, such as pulses 60 through 62 shown in FIGURE 3, which are each followed by the transfer of the contents of the register 21 to the counter 26. After each interrogation pulse, the counter 26 counts down as described previously providing an output to the delay counter 29 which in turn provides the range gate pulse on the output line 48. If the initial contents of the register 21 were zero, the counter 26 provides an output on the line 28 after the transfer since no count down is required. As will appear subsequently, until a sufficient number of proper return pulses are received, the inputs on the line 85 to 88 to the "and" gate 77 are true, and thus, upon the occurrence of the range gate pulse on the line 76 the "and" gate 77 sets the search control flip-flop 74. Whenever the flip-flop 74 is set, it provides a true output on the line 90 to enable the "and" gate 36 to pass clock pulses from the clock 34 through the "and" gate 36 and the "or" gate 19 to the count up input of the register 21. In this manner, the contents of the register 21 are increased, ultimately causing a range gate pulse from the delay counter 29 to occur at a later time to search for, or bracket, a proper return pulse.

Assuming that the first interrogation pulse and the first range gate pulse have been generated as described above and a return pulse is received at the input terminal 11, the search control flip-flop 74 is reset. However, if no return pulse is received, the flip-flop 74 remains set by the gate 77 and allows the contents of the register 21 to continue to increase. Assuming that a pulse is received but it is not a proper return pulse (not bracketed by the range gate pulse), the output of the "and" gate 72 is false because both inputs thereto are not true at the same time. Thus, this return pulse is not counted by the majority decision counter 81. If the return pulse is a proper return pulse, i.e., bracketed by the range gate pulse, the output of the "and" gate 72 provides a true output on the line 78. This output is applied to the input of the majority decision counter 81 and counted.

Assuming now that another interrogation pulse is generated followed by another range gate pulse, the flip-flop 74 is again set because all inputs to the "and" gate 77 are true. Again, if no return pulse is received, the flip-flop 74 remains set thereby causing the contents of the register 21 to be up-dated. However, the next return pulse will reset the flip-flop 74. If the next return pulse is not a proper return pulse, it will not be counted by the majority decision counter 81, but will be counted if it is a proper return pulse. As long as fewer than three out of five proper return pulses are received, the output of the counter 81 on the line 88 remain true. Likewise, if a sufficient number of proper return pulses are not received, the "not track" output line 85 of the level detector 83 is true. After three proper return pulses have been received, the output of the counter 81 goes false thereby causing the output of the "and" gate 77 to go false. This prevents the flip-flop 75 from being set again whenthe late gate pulse occurs, and thus the register is not further updated by clock pulses from the "and" gate 36.

FIGURE 3 illustrates three proper return pulses 63 through 65 which cause the counter 81 to provide a false output thereby disabling the "and" gate 77. The next return pulse resets the search control flip-flop 74 thereby preventing clock pulses from being passed through the "and" gate 36 to the register 21. Since a sufficient number (three) of pulses have been received, the output of the "and" gate 77 remains false and does not set the flip-flop 74.

The tracking integrator 79, which may include a resistance-capacitance circuit, averages the pulses applied to the input thereof and its output increases in level. When the output of the line 82 goes up to a given level, in response to a sufficient number (such as five) of proper return pulses, the level detector 82 provides a true output on the line 84 and a false output on the line 35 and the system goes into the track mode. When the system goes into the track mode, the frequency of interrogation pulses is reduced will be explained subsequently.

The tracking filter 14 has a "velocity memory" even if pulses are lost temporarily. The error signal stored therein, such as on a capacitor, holds a voltage which continues to maintain the oscillator 16 at a given output rate for driving the register 21. Also, the level in the tracking integrator 79 stays up in a similar manner to maintain the system in the track mode even if several proper return pulses are lost temporarily.

The system remains in the track mode until reset, such as when the system is switched to track return pulses from another ground beacon, or until a number of proper return pulses are not received in which case the signal on the line 82 goes down and the output on the line 85 from the level detector 83 goes true. Other ground beacons may be selected in a conventional manner by switching channels, in which case the range system in FIGURE 2 is reset.

The majority decision counter 81 serves to count proper return pulses when the system is in the search mode, and provides a true output as long as fewer than three proper return pulses have been received when five interrogation pulses are generated. The interrogation pulse line 42 from the generator 39 is connected to an input of an "and" gate 95, the output of which is connected to the input of a counter 96 which provides a true output level on a line 97 for a predetermined number of counts, such as one through five counts. The output line 97 is connected to an input of an "and" gate 98 and the line 80 is connected to another input of the gate 98. The line 80 also is connected through a line 99 to the set input of a flip-flop 100, one output of which is connected through a line 101 to another input of the gate 95. The output of the "and" gate 98 is connected to an input of a counter 103, and the respective zero, one, and two output lines 104 through 106 thereof are connected through an "or" gate 107 to an input of an "and" gate 108. Thus, the output of the "or" gate 107 is true when the output of the counter 103 is between zero and two. The "not track" line 86 is connected to another input of the "and" gate 108, and the output of the "and" gate 108 on the line 88 indicates fewer than three out of five gated return pulses have been received when this output is true.

The first gated return pulse on the line 80 sets the flip-flop 100 which in turn enables the "and" gate 95. When the "and" gate 95 is enabled, interrogation pulses on the line 42 are passed to the counter 96 and counted. The counter 96 provides a voltage level or true output for counts of one through five. Thus, after an interrogation pulse has been counted by the counter 96 (and until the counter 96 is reset which typically occurs some time after the fifth pulse has been counted) the output thereof enables the "and" gate 98 to pass gated return pulses to the counter 103. Until the counter 103 counts three pulses, the "or" gate 107 provides a true input to the "and" gate 108. A true input ($\overline{track}$) is applied on the line 86 to the "and" gate 108 which provides a true output on the line 88 indicating that fewer than three out of five proper return pulses have been received. When the counter 103 counts three pulses, the output of the "or" gate 107 goes false causing the output of the "and" gate 108 to go false. The output of the "and" gate 108 on the line 88 is used as discussed previously to enable or disable the "and" gate 77 which allows the search control flip-flop 74 to be set in the "not track" mode during range gate pulses when a sufficient number of proper return pulses have not been received.

The output of the gate 3 in the circuit of FIGURE 1 may be used to indicate that a pair, rather than a single false pulse, is received in the search mode to prevent the system in FIGURE 2 from continuing to search for false pulses. That is, if a false pulse is received, the majority decision counter 81 can be reset rather than waiting to detect further reply pulses. The line 5 may be connected through a line 114 to the set input of a flip-flop 115 in the majority decision counter 81. The lower output (false when the flip-flop is set) is connected through a delay circuit 116 to an input of an "and" gate 117. The interrogation pulse line 42 is connected to the reset input of the flip-flop 115 and to another input of the gate 117. The output of the gate 117 is connected through a line 118 to an "or" gate 119. A reset line also is connected to the gate 119. The output of the gate 119 is connected through a line 120 to the reset input of the flip-flop 100, and to the reset inputs of the counters 96 and 103.

An interrogation pulse on the line 42 resets the flip-flop 115 causing the lower output thereof to go true. After a short delay, the gate 117 is enabled. If no pulse pair is received as indicated by no signal on the line 114, the next interrogation pulse causes the output of the gate 117 to go true thereby resetting flip-flop 100, and counters 93 and 103 of the majority decision counter 81 through the gate 119. If a pair had been received, the flip-flop 115 would have been set thereby disabling the gate 117 after the short delay provided by the delay circuit 116. In this latter case, the following interrogation pulse would not cause the counter 81 to be reset.

The pulse repetition frequency generator 39 in FIGURE 2, which is described in greater detail in said copend application, includes an input line 110 which supplies signals thereto indicative of whether the system is in the track or $\overline{track}$ (search) mode. These signals may be derived from the level detector 83. The discriminator 10 provides an output on the line 13 which is applied through a line 111 to the generator 39. The generator 39 essentially includes a voltage controlled oscillator connected to an "and" gate to provide interrogation pulses on an output line 42 synchronized with clock pulses from the basic clock 34. The line 110 is connected through a resistance to a summing junction which is connected to the input of the voltage controlled oscillator within the generator 39. Noise signals also are supplied to the oscillator. As is conventional, the output frequency of the oscillator is determined by the voltage input thereto. One voltage level (such as a true signal) is applied on the line 110 in the track mode to cause the oscillator to provide an output at one frequency, such as between 3 and 30 pulses per second; whereas another voltage level (such as a false signal) is applied to the line 110 in the search mode to cause the oscillator to provide output pulses at another frequency, such as between 30 and 150 pulses per second. The noise signals are used to cause the frequency of the oscillator to vary in a random manner, and typically a mixture of sine waves is used.

When used in a navigation system, the output voltage of the discriminator 10 in FIGURE 2 is proportional to the change in velocity with respect to the change in time (i.e., $dv/dt$), and therefore, is proportional to acceleration of the airplane with respect to the ground beacon. Accordingly, this voltage may be applied through the line 111, a low pass filter and a summing resistance of the aforementioned summing junction to affect the operation of the oscillator within the generator 39. This can be used to increase the output frequency of the oscillator when the acceleration is high, such as when the plane is close to the beacon; and to decrease the output frequency thereof when the acceleration is low, such as when the plane is far from the beacon. Inasmuch as any individual ground beacon must communicate with a number of planes at any given time, it is helpful if the rate at which a plane communicates with the beacon is as low as possible while still providing the necessary information to the pilot. The use of the voltage proportional to acceleration can reduce the rate at which interrogation pulses are generated when a high rate is not required; but increase this rate up to a standard maximum rate when the range information must be up-dated frequently, such as when the airplane is close to the ground beacon.

The voltage controlled oscillator 16 in FIGURE 2 responds to positive and negative error signals averaged by the tracking filter 14 to provide count up or count down pulses to the register 21. For example, a positive input to the oscillator may indicate that the return pulse occurred early in which case count down pulses are provided; whereas the output may be negative indicating that the return pulse occurred late in which case count up pulses are generated. When the error signal is zero neither count up or count down pulses are generated.

While the present invention has been described in connection with use in a radio air navigation system, it should be understood that other applications are possible. The invention, therefore, may be embodied in other forms not departing from the spirit or central characteristics thereof. The present embodiment is to be considered in all respects as illustrative and not restrictive, the scope of the invention being indicated by the appended claims rather than by the foregoing description and all changes which come within the meaning and range of equivalency of the claims therefore are intended to be embraced thereby.

What is claimed is:

1. A circuit for receiving plural pairs of pulses and passing the first pulse of each pair and generating a signal indicating that a pulse pair has been received, the pulses of each pair having a predetermined spacing therebetween, comprising
    an input terminal for receiving said plural pairs of pulses,
    first gate means, said input terminal being connected to an input of said first gate means and being connected through first delay means to another input of said first gate means, said first delay means providing a delay substantially equal to said predetermined spacing, and said first gate means providing an output signal at an output thereof when the pulses of a pair have said predetermined spacing,
    control means having first and second inputs and an output, said first input causing said control means to provide a first output signal at the output thereof and said second input causing said control means to provide a second output signal at the output thereof, and
    second gate means, said input terminal being connected to said second input of said control means and to an input of said second gate means, means connecting the output of said first gate means with the first input of said control means, and means connecting the output of said control means with another input of said second gate means, said second gate means serving to pass only the first pulse of a pair of pulses having said predetermined spacing.

2. A circuit as in claim 1 wherein
    said means connecting the output of said first gate means with the first input of said control means and said means connecting the output of said control means with another input of said second gate means include delay means each providing a time delay approximately equal to one-half the time duration of a pulse of a pulse pair.

3. A circuit for receiving plural pairs of pulses and passing the first pulse of each pair, the pulses of each pair having a predetermined spacing therebetween, comprising
    an input terminal for receiving said plural pairs of pulses,
    first means coupled with said input terminal and having an output for providing an output signal when the pulses of a pair have said predetermined spacing,
    control means having first and second inputs and an output, said first input causing said control means to provide a first output signal at the output thereof and said second input causing said control means to provide a second output signal at the output thereof, and
    gate means, said input terminal being connected to said second input of said control means and to an input of said gate means, means connecting the output of said first means with the first input of said control means, and means connecting the output of said control means with another input of said gate means, said gate means serving to pass only the first pulse of a pair of pulses having said predetermined spacing.

4. A circuit as in claim 3 wherein
    said control means include a bistable device having two stable states, and
    said means connecting the output of said first means with the first input of said control means and said means connecting the output of said control means with another input of said gate means include delay means each providing a time delay approximately equal to one-half the time duration of a pulse of a pulse pair.

5. A system for measuring the time delay between generated first signals and received second signals, said second signals including proper and improper signals, said system including register means for accumulating and storing data indicative of said time delay and including means coupled with said register means for searching for said proper signals somprising
    control means coupled with said register means for causing an increase in the contents of said register means,
    counting means for counting said second signals and having an output coupled to said control means for providing an output signal to said control means indicating that a predetermined number of proper signals have been received in response to the generation of a predetermined number of said first signals, and
    circuit means for receiving said second signals and providing a predetermined output signal indicating that a proper signal is received, said output signal of said circuit means being coupled to said counting means to allow said counting means to count said proper signals.

6. A system as in claim 5 wherein
    said first signals are applied to said counting means, certain of said first signals causing said counting means to be reset in the absence of a predetermined output signal from said circuit means.

7. A system as in claim 5 wherein
    said second signals include pulse pairs, said proper signals being the first pulses of pulse pairs having a predetermined spacing between the pulses thereof, and
    said circuit means includes an input terminal for receiving said pulse pairs, first means coupled with said input terminal and having an output for providing said predetermined output signal when the pulses of a pair have said predetermined spacing, bistable means having first and second inputs and an output, said first input of said bistable means causing said bistable means to provide a first output signal at the output thereof and said second input of said bistable means causing said bistable means to provide a second output signal at the output thereof, and gate means, said input terminal being connected to said second input of said bistable means and an input of said gate means, means connecting the output of said first means with the first input of said bistable means and means connecting the output of said bistable means with another input of said gate means, said gate means serving to pass only the first pulse of a pair of pulses having said predetermined spacing to said counting means.

8. A system for measuring the time delay between generated pulses and the first pulse of received pulse pairs, said system including register means for accumulating and storing data indicative of said time delay, means connected with said register means for generating at gate signal representing the predicted time delay, and means for comparing said gate signal with said first pulse of a received pulse pair, means coupled to said comparing means for supplying said first pulse of said pair thereto comprising an input terminal for receiving said pairs of pulses, first gate means, said input terminal being connected to an input of said first gate means and being connected through first delay means to another input of said first gate means, said first delay means providing a delay substantially equal to a predetermined spacing between the pulses of a pair, and said first gate means providing an output signal at an output thereof when the pulses of said pair have said predetermined spacing, control means having first and second inputs and an output, said first input causing said control means to provide a first output signal at the output thereof and said second input causing said control means to provide a second output signal at the output thereof, and second gate means, said input terminal being connected to said second input of said control means and to an input of said second gate means, means connecting the output of said first gate means with the first input of said control means, and means connecting the output of said control means with another input of said second gate means, the output of said second gate means being coupled to said comparing means with said second gate means serving to pass only the first pulse of said pair of pulses having said predetermined spacing.

9. A system as in claim 8 including means coupled with said register means for searching for said pulse pairs comprising control means coupled with said register means for causing an increase in the contents of said register means, counting means for counting said first pulses of said pairs of pulses and having an output coupled to said control means for providing an output signal to said control means indicating that a predetermined number of proper said first pulses have been received in response to the generation of the predetermined number of said generated pulses, and circuit means for receiving the first pulses of said pairs of pulses and providing a predetermined output signal indicating that a proper said first pulse is received, said last mentioned output signal of said circuit means being coupled to said counting means to allow said counting means to count said proper first pulses.

10. A system for measuring the time delay between generated pulses and the first pulse of received pulse pairs comprising discriminator means for comparing said first pulse of received pulse pairs with respective gate signals representing the predicted times of arrival of said respective first pulse of received pulse pairs, said gate signals being respectively generated in response to said generated pulses, and said discriminator means providing error signals proportional to the time deviation of said first pulse of received pulse pairs signals from predicted times represented by respective gate signals, pulse generating means coupled with the output of said discriminator means for providing output signals as a function of said error signal, register means, counter means, gating means coupling said register means with said counter means, said register means being coupled with said pulse generating means for accumulating the output signals of said pulse generating means, the contents of said register means being representative of the predicted time delay between respective generated pulses and said first pulse of received pulse pairs, enabling means coupled with said gating means and counter means for transferring the contents of said register means to said counter means and for enabling the contents of said counter means to change at a predetermined rate and to generate said gate signals after the occurrence of a predetermined change of said contents in said counter means, searching means coupled with said register means for causing a change of the contents thereof in response to gate signals and said first pulses as a function of the deviation of said first pulses with respect to a portion of respective gate signals, and said searching means including counting means and circuit means, said counter means functioning to count said first pulses of said pulse pairs and said circuit means being coupled to said counting means and responsive to said first pulses to enable modification of the count of said counting means if said pulse pairs are not received.

11. A circuit for receiving plural pairs of pulses and passing the first pulse of each pair and generating a signal indicating that a pulse pair has been received, the pulses of each pair having a predetermined spacing therebetween, comprising an input terminal for receiving said plural pairs of pulses, first gate means, said input terminal being connected to an input of said first gate means and being connected through first delay means to another input of said first gate means, said first delay means providing a delay substantially equal to said predetermined spacing, and said first gate means providing an output signal at an output thereof when the pulses of a pair have said predetermined spacing, bistable means having first and second inputs and an output, the output of said first gate means being coupled through second delay means to said first input of said bistable means and said input terminal being coupled to said second input of said bistable means, and second gate means having first and second inputs and an output, said input terminal being connected to said first input of said second gate means, and the output of said bistable means being coupled through third delay means to the second input of said second gate means, said second and third delay means each providing a time delay approximately equal to one-half the time duration of a pulse of a pulse pair, and said second gate means serving to pass only the first pulse of a pair of pulses having said predetermined spacing.

12. A system for measuring the time delay between generated first signals and received second signals, said second signals including proper and improper signals and said second signals comprising pulse pairs with the proper signals being the first pulses of pulse pairs having a predetermined spacing between the first and second pulses thereof, said system including register means for accumulating and storing data indicative of said time delay and including means coupled with said register means for searching for said proper signals comprising control means coupled with said register means for causing an increase in the contents of said register means, counting means for counting said proper signals of said second signals and having an output coupled to said control means for providing an output signal to said control means indicating that a predetermined number of proper signals have been received in response to the generation of a predetermined number of said first signals, and circuit means for receiving said second signals and providing a predetermined output signal indicating that a proper signal is received, said output signal of said circuit means being coupled to said counting means to allow said counting means to count said proper signals.

References Cited

UNITED STATES PATENTS 2,546,972 4/1951 Chatterjea et al. ----- 328—109
2,626,352 1/1953 Alvarez ------------ 328—109
3,150,352 9/1964 Einsel et al. -------- 328—109

JOHN S. HEYMAN, Primary Examiner

B. P. DAVIS, Assistant Examiner

U.S. Cl. X.R.

343—7; 328—111